(12) United States Patent
Lemieux

(10) Patent No.: US 6,740,387 B1
(45) Date of Patent: May 25, 2004

(54) SYNTHETIC TURF GAME SURFACE

(75) Inventor: Alain Lemieux, Sherbrooke (CA)

(73) Assignee: 2752-3273 Quebec Inc., Montreal (CA)

( * ) Notice: Subject to any disclaimer, the term of this patent is extended or adjusted under 35 U.S.C. 154(b) by 0 days.

(21) Appl. No.: 09/445,617

(22) PCT Filed: Jun. 9, 1998

(86) PCT No.: PCT/CA98/00559
§ 371 (c)(1),
(2), (4) Date: Dec. 8, 1999

(87) PCT Pub. No.: WO98/56993
PCT Pub. Date: Dec. 17, 1998

(51) Int. Cl.[7] .............. B32B 33/00; B32B 3/10; B32B 3/18
(52) U.S. Cl. .............. 428/95; 428/87; 428/89; 428/92; 428/17
(58) Field of Search .............. 428/87, 89, 92, 428/95, 17

(56) References Cited

U.S. PATENT DOCUMENTS

| | | |
|---|---|---|
| 1,970,959 A | 8/1934 | Gauntlett |
| 3,332,828 A | 7/1967 | Faria et al. |
| 3,418,897 A | 12/1968 | Humalainen |
| 3,551,263 A | 12/1970 | Carter et al. |
| 3,596,576 A | 8/1971 | Cicero et al. |
| 3,597,297 A | 8/1971 | Buchholtz et al. |
| 3,869,128 A | 3/1975 | Ohashi |
| 3,995,079 A | 11/1976 | Haas, Jr. |
| 4,336,286 A | 6/1982 | Tomarin |
| 4,337,283 A | 6/1982 | Haas, Jr. |
| 4,356,220 A | 10/1982 | Benedyk |
| 4,389,435 A | 6/1983 | Haas, Jr. |
| 4,396,653 A | 8/1983 | Tomarin |
| 4,426,415 A | 1/1984 | Avery |
| 4,497,853 A | 2/1985 | Tomarin |
| 4,505,960 A | 3/1985 | Leffingwell |
| 4,637,942 A | 1/1987 | Tomarin |
| 4,830,798 A | 5/1989 | Maeda |
| 4,844,470 A | 7/1989 | Hammon et al. |
| 4,882,208 A | 11/1989 | Breitscheidel et al. |
| 4,931,477 A * | 6/1990 | Shiiki et al. .............. 521/58 |
| 5,026,580 A | 6/1991 | Hammon |
| 5,035,275 A * | 7/1991 | Yamaguchi .............. 164/34 |
| 5,205,562 A | 4/1993 | Hammon |
| 5,356,344 A | 10/1994 | Lemieux |
| 5,373,667 A | 12/1994 | Lemieux |
| 5,678,951 A | 10/1997 | Levasseur |
| 5,820,475 A * | 10/1998 | Luna .............. 473/137 |
| 5,958,527 A | 9/1999 | Prevost |

FOREIGN PATENT DOCUMENTS

| | | |
|---|---|---|
| CA | 836395 | 3/1970 |
| CA | 885709 | 11/1971 |
| CA | 1 246 109 | 12/1988 |
| CA | 2043170 | 11/1992 |
| CA | 2122926 | 5/1993 |
| CA | 2095156 | 10/1994 |

* cited by examiner

Primary Examiner—Cheryl A Juska
(74) Attorney, Agent, or Firm—Harness, Dickey & Pierce, P.L.C.

(57) ABSTRACT

A synthetic turf surface for golf courses, tennis courts and other grass-surfaced game playing fields is formed of a synthetic grass carpet having a flexible base sheet with closely spaced-apart upright, blade-like strands of plastic material forming a dense grass-like surface. The carpet is supported upon a cushioning underpad which is formed of a thick, molded sheet of open cell, expanded bead polypropylene. The resiliently compressible polypropylene underpad combined with the synthetic grass carpet closely simulates the feel of a natural grass covered playing field surface.

44 Claims, 2 Drawing Sheets

SYNTHETIC TURF GAME SURFACE

TECHNICAL FIELD

This invention relates to an improved synthetic turf surface for grass-type game playing fields.

BACKGROUND OF INVENTION

Synthetic turf game playing surfaces typically are formed of carpets having upright piles or strands that are fastened to a base or backing sheet. The strands may be formed of thin, flat, narrow strips of suitable plastic material which may be gathered into tufts that are fastened to the base sheet. Commonly, the base sheet is formed of a woven cloth, made of a suitable plastic fabric, with a resilient coating or binder applied to the base sheet for anchoring the strands thereto. The detailed construction of such pile carpets varied considerably. However, in general, they are made of a weather resistant or outdoor type of construction.

Such carpets are usually laid upon a prepared, flat ground surface to form a game playing field which is intended to simulate a natural grass playing field surface. For some types of games, a resilient underpad is placed beneath the carpet and upon the firm ground support surface to provide a shock absorbing effect. Also, in some instances, a layer of sand or other particulate material is placed upon the upper surface of the carpet base sheet and around the strands. An example of this type of construction is shown in U.S. Pat. No. 4,389,435 issued Jun. 21, 1983 to Frederick T. Haas, Jr. Another example is shown in U.S. Pat. No. 4,637,942 issued Jan. 20, 1987 to Seymour A. Tomarin.

Further, examples of artificial turfs which are formed with the grass-like carpet placed upon a resilient underpad are disclosed in U.S. Pat. No. 3,551,263 issued Dec. 29, 1970 to Carter et al., which discloses a polyurethane foam underpad; U.S. Pat. No. 3,332,828 issued Jul. 25, 1967 to Faria et al., which discloses a PVC foam plastic or polyurethane foam plastic underpad; U.S. Pat. No. 4,637,942 issued Jan. 20, 1987 to Seymour A. Tomarin which discloses a rubber-like underpad; U.S. Pat. No. 4,882,208 issued Nov. 21, 1989 to Hans-Urich Brietschidel, which illustrates a closed cell polyethylene foam underpad; U.S. Pat. No. 3,597,297 issued Aug. 3, 1971 to Theodore Buchholz et al., which discloses a polyurethane underpad having voids; and U.S. Pat. No. 4,505,960 issued Mar. 19, 1985 to James W. Leffingwell, which discloses shock absorbing pads made of foamed polyvinyl chloride, polyethylene, polyurethane, polypropylene, etc.

As these various prior patents demonstrate, there has been a search in the past for an underpad material and construction which, when combined with a suitable synthetic blade forming carpet, provide a game playing surface which very closely simulates the feel and action and reaction effect of a natural grass playing field surface. The large variety of materials disclosed in the foregoing patents demonstrate that such a synthetic turf playing surface had not been found.

The present invention relates to a particular plastic underpad surface combined with an artificial grass forming carpet which very closely simulates a natural grass field which is particularly close in feel and performance to the natural grass portions of a typical golf course, as well as being very similar to other natural grass surface game playing fields.

SUMMARY OF INVENTION

This invention contemplates combining with a synthetic grass carpet a particular resilient polypropylene molded underpad which, together with the synthetic grass carpet, produces an effect which is strikingly similar to a natural grass playing surface formed particularly for golf courses. Thus, this invention contemplates utilizing expanded beads of polypropylene of a density of approximately between about 1.3 to 2.8 pounds per cubic foot molded into a thick sheet or pad of open cell structure with a density of between about 1.5 to 3 pounds per cubic foot. The combined turf carpet and supporting underpad effect may be enhanced by treating the free ends of the synthetic grass blades with a sandblast which splits or shreds the blade ends into fine slivers which intertwine and entangle with each other to form a dense mat upper surface upon the carpet.

An object of this invention is to provide an artificial turf with a particular resilient underpad formed of open cell, expanded beads polypropylene plastic which produces, as part of the turf surface, an effect which very closely simulates a natural grass playing field.

These and other objects and advantages of this invention will become apparent upon reading the following description, of which the attached drawings form a part.

DETAILED DESCRIPTION

Figures 1, 2:
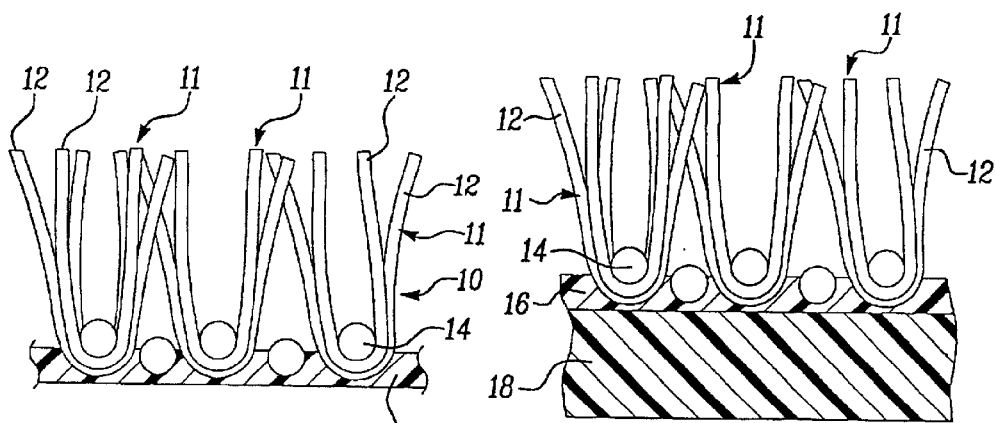
FIG. 1 is a schematic, fragmentary, cross-sectional end view of a synthetic turf pile carpet.
FIG. 2 is a schematic view similar to FIG. 1, showing the carpet positioned upon a resilient, molded open cell, expanded bead polypropylene underpad.
Figures 3, 4:
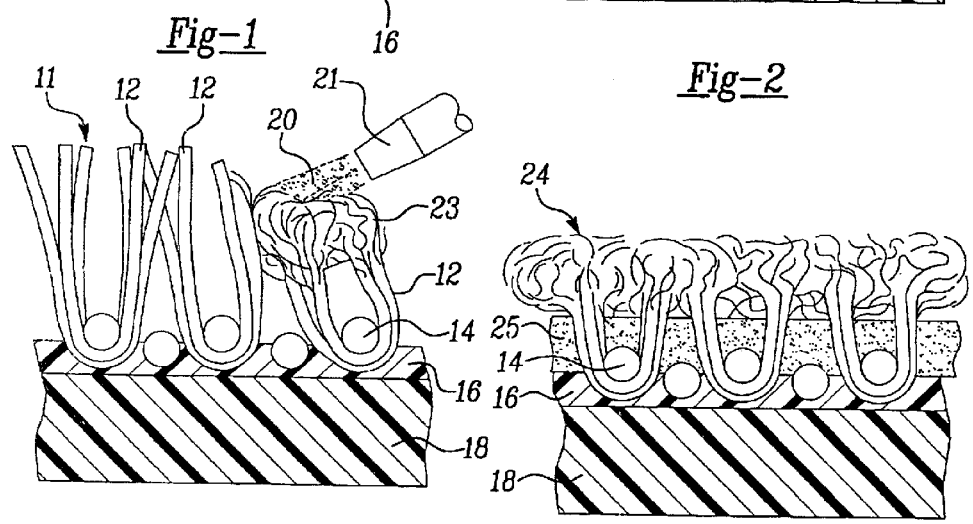
FIG. 3 is a view, similar to FIG. 2, illustrating the step of sandblasting the upper end portions of the blade forming strands of the carpet.
FIG. 4 schematically illustrates the artificial turf surface with the dense mat formed by the shredded slivers and with a layer of sand deposited by the sandblasting step upon the upper surface of the carpet base sheet.

FIG. 1 schematically illustrates a fragment of a synthetic turf pile carpet 10. The carpet has numerous, closely spaced, tufts 11 which are formed of U-shaped, flat, narrow bent strips or strands 12 that form artificial grass blades. The turfs are fastened upon a base or backing sheet 14. This sheet may be made of a woven cloth or the like fabric material formed of stable, weather resistant, plastic such as polypropylene or nylon fibers or the like. The specific cloth must be flexible but, otherwise, may vary as to its composition.

As schematically illustrated in FIG. 1, the tufts are inserted around or through the fibers forming the base sheet.

A suitable binder layer 16 may be applied to bind the turfs and base sheet together. The binder may be formed of a polyurethane adhesive material or some other suitable, outdoor usable adhesive which remains resilient or flexible.

The carpet is placed upon a resilient cushion underpad 18. This underpad is formed of a relatively thick, molded sheet or pad of resilient, open cell, expanded bead polypropylene. The sheet may be approximately between about ½ inch to 2 inches in thickness, with a preferred density of approximately 2.36 pounds per cubic foot. The density may be varied within the range of between about 1.5 to 3 pounds per cubic foot. The thickness of the pad, depending upon the particular results desired, may also be varied from about ¼ inch thickness to as much as up to 12 inches thick.

Figure 6:
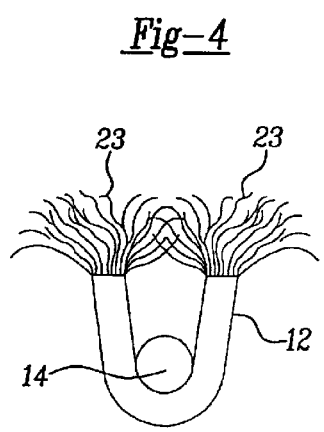
FIG. 6 schematically illustrates a single U-shaped strand whose free upper ends have been shredded into fine slivers by the sandblasting treatment.

With the carpet positioned upon the resilient cushion underpad 18, the upper portions of the strands or blades are sprayed with a blast of sand 20 or similar sand-like particulate material from a pressurized nozzle 21. This blast of sand shreds each of the strand upper end portions into numerous slivers 23 (see FIG. 6). The slivers extend laterally and intertwine and entangle together to form a dense mat 24.

The spray nozzle 21 may be moved back and forth from one side to the other in a scanner-like movement across the upper end portions of the blades formed by the strands. The exact pressure of the sand blast spray may be varied. However, a preferred blast pressure is in the range of 100 to 120 pounds per square inch. The blast may use silica sand of a size range of between about 16 to 40 mesh and, preferably, in the range of between about 20 to 24 mesh or even more preferably in the approximate area of 24 mesh. The sandblasting is conducted at a speed of movement and for a length of time which is sufficient to shred the strand end portions into finely divided slivers. For example, the upper, about one-fifth portions of the blades may be shredded into fine slivers that remain attached to their respective blades.

The force of the sand blast, depending upon how long, that is, how slowly the blast is moved across the surface of the carpet, not only shreds the blades, but also forces the sprayed sand downwardly between the strands to deposit sand upon the surface of the base sheet of the carpet. The sand layer 25 formed thereby may be kept upon the base sheet of the carpet where it is maintained in position by the dense intertwined or entangled sliver mat formed on the upper ends of the blades.

By way of example, a blade height of approximately ⅝ of an inch above the surface of the base sheet, which is useful for a golf green surface may have its upper 20 to 33 percent of its length shredded into fine slivers. In this example, strands which are approximately ¹⁄₁₆ of an inch, i.e. about 0.07 inches, wide and about 0.002 inches thick, so that they are approximately rectangular in cross-section. They are bent in half, to form two blades, and are gathered into tufts of about 9 to 11 strands. These form about 18 to 22 blades per tuft. The upper about 20 percent portions of each blade may be severed into about four slivers. Thus, each tuft may have as many as about 70 to 80 slivers whose lower ends remain attached to the blade body and whose upper ends extend off into transverse directions to entangle with the slivers of adjacent strands. The slivers are about 0.02 inches in width and about 0.075 to 0.125 inches long.

Following the sandblasting step, the carpet may be further treated with a high pressure water spray 27 applied by a pressurized nozzle 28. The water spray, which, for example, could be at a roughly 100 to 150 pounds per square inch nozzle pressure, acts like a wash which further separates adjacent slivers that were shredded, but not fully separated from each other on the same strand, and simultaneously further twists, bends and entangles the slivers of one strand with slivers on its adjacent strand to further densify the mat formed by the intertwined slivers. This forms a denser and more uniform mat surface.

Figure 5:
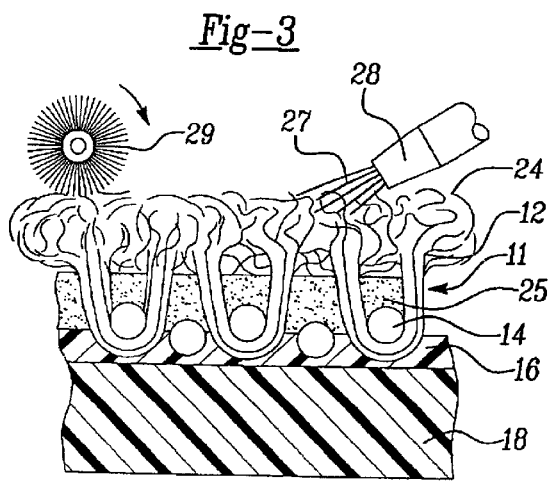
FIG. 5 schematically illustrates a further, optional, step of spraying the carpet with a water wash for further severing the slivers on a strand while additionally entangling or intertwining adjacent slivers to form the dense mat surface and, also, a rotary brush treating the upper surface of the mat.

The mat surface may be further treated by brushing it with, for example, a rotary brush 29 applied upon the mat surface to make the mat surface more uniform. The water jet and the brushing may be performed successively or at the same time as schematically illustrated in FIG. 5.

Significantly, the force of the sandblasting is sufficiently absorbed through the resilient cushioning pad beneath the carpet to prevent the strands from becoming crushed or permanently deformed or compacted by such force. That is, the strands remain or return to their upright positions after their upper ends are sand blasted. The upright positions are maintained, in part, by the deposited sand layer 25. Similarly, the strands and the mat 24 hold the sand layer 25 in place.

The sand layer filling may be kept in place and the matted carpet may be rolled and transported to the site where it is to be spread and used with the sand layer. This permits the sand blast treatment to be performed either on the site of the game playing field or at any work site or factory area where the application of the sand, water and brushing treatments may be more conveniently performed. Thus, the treated carpet may be unrolled and installed at the game surface site when desired and the sand layer will remain in place and additional sand at the use site for a sand filling may not be needed.

As mentioned, the particular pile carpet construction may be varied. However, an example of a useful carpet for a golf green comprises synthetic grass of approximately 7,600 deniers, an approximate density of 42 ounces per square yard, and a fiber height of approximately ⅝ inch combined with an underpad of ½ inch to 2 inches in thickness.

Similarly, an example of a fairway portion of a golf course may be in the range of approximately 7,600 deniers synthetic grass, an approximate density of 42 to 55 ounces per square yard, with a fiber height of about ⅝ to 2 inches with an underpad of at least about one inch thick.

Still another example of the synthetic grass would be a weaving standard in the range of 3,600 to 10,000 deniers, with 13 to 22 stitches per 3 inches, ³⁄₁₆ gage and a density of about 34 to 65 ounces per square yard of material.

The raw beaded polypropylene material is commercially available and can be molded into underpads of the desired density. By way of example, expanded polypropylene beads are available from BASF under the trade name of NEOPOLEN P, which is a trademark of BASF. This material is available at densities of 1.3, 1.9 and 2.8 pounds per cubic foot and is referenced by BASF by its trademark EPERAN PP, types PP45, PP30 and LBS 20. When the beads are molded in appropriate slab molding equipment at times and pressures known to those skilled in the art, the resulting pad, produced in the desired thickness, can be made in a density ranging from 1.5 to 3 pounds per cubic foot. The molded slab or sheet will have an open cell construction. The specific density selected may be varied for specific sport activities. For example, a density that has been found satisfactory for a golf green is in the range of approximately 2.36 pounds per cubic foot.

The particular technique useful for the sandblast treatment involves sandblasting under pressure using commercially available sandblast equipment. A pressure in the range of 100 to 120 pounds per square inch is preferred but the pressure may be varied somewhat, such as a low of about 80 pounds per square inch. By moving the spray nozzle in back and forth movements across the surface of the carpet, the projected spray is sequentially concentrated upon small portions of the carpet. The angle of the projected spray may vary but a preferred angle, which appears to be effective in a minimum of time, is an angle of about 70 to 80 degrees relative to the plane of the carpet. The distance of the nozzle from the strands may vary, with the equipment operator selecting the optimum distance by visually observing the shredding action of the spray. An example of the distance may be in the range of about 4 to 5 feet, depending upon the speed of movement of the nozzle across the carpet.

The resulting synthetic turf is particularly useful for golf courses, such as the green portions, approach portions, Tee-off portions and fairway. The turf surface also may be used for tennis courts, football or soccer as well as for other sports which utilize grass surfaces. Examples of these are grass hockey, croquet, grass bowling, children playground, baseball, and the like. The surface of the artificial turf produced by the method herein, closely simulates the feel and action or rebound produced by a natural grass surfaced playing field. The completed, matted surface very closely simulates the natural grass surfaces required for golf courses and the similar playing fields. This turf may also be useful upon a rooftop or patio or deck surface where the turf will provide an insulated, waterproof covering.

Figure 7:
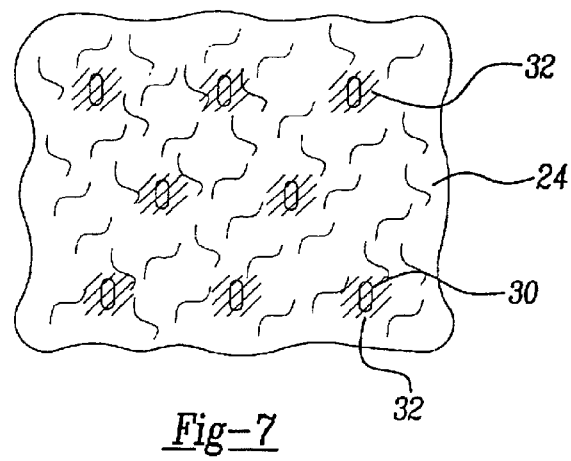
FIG. 7 schematically illustrates a fragmentary portion of a golf course where the golfer may use a Tee.
Figure 8:
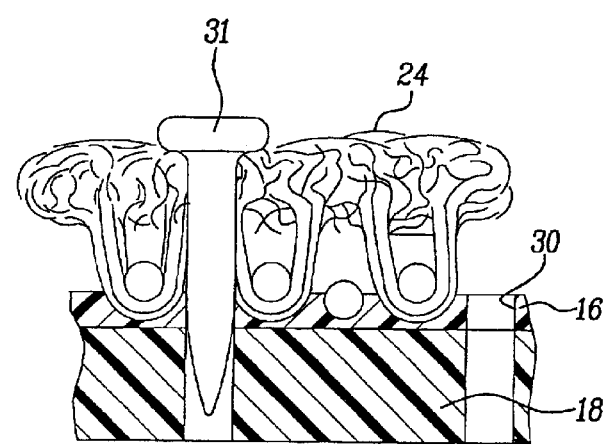
FIG. 8 is an enlarged, fragmentary, schematic, cross-sectional view showing a Tee inserted in a slot provided in artificial turf which has a mat formed on its upper surface.
Figure 9:
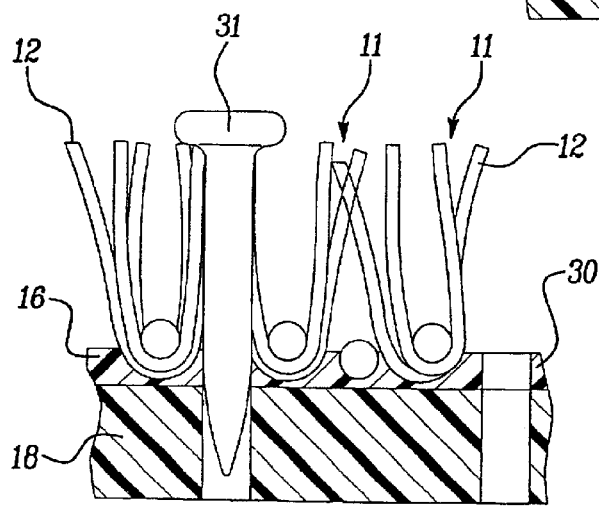
FIG. 9 is a view similar to FIG. 8 showing a Tee inserted in a slot formed in turf which is not formed with upper end slivers and a matted surface.

As illustrated in FIGS. 7 and 9, the turf may be used on golf courses in Tee-off places, that is, at locations where the golfer uses a Tee to support the ball for a drive. In those locations, a number of slits 30 may be made in the turf carpet base sheet and underpad to receive a manually inserted standard Tee. The slits 30 may be of a size to closely receive a Tee 31. To assist the golfer in locating a particular slit, a colored mark 32 may be applied, as by a suitable ink or paint mark, on the surface of the turf. FIG. 7 shows the turf with the sliver forming mat and FIG. 8 shows the turf mold without the surface mat. In either case the slots can be used to receive the golfer's Tee.

This invention may be further developed within the scope of the following claims. Accordingly, it is desired that the foregoing description be read as being merely illustrative of an operative embodiment of this invention and not in a strictly limiting sense.

I claim:

1. A synthetic turf surface for simulating golf and other natural grass game playing surfaces formed of a synthetic grass carpet having a flexible base sheet with spaced apart, upright strands of plastic material intended to form artificial grass blades secured to the sheet, and with the strands forming an exposed upper surface and said base sheet being positioned upon a resilient cushion underpad arranged upon a support surface, the improvement comprising:

said underpad being formed of a sheet of a molded, open cell, expanded, resilient polypropylene material formed from polypropylene beads being of density of between about 1.3 to 2.8 pounds per cubic foot and said underpad being of a thickness of between about ¼ inch to 12 inches;

whereas said carpet and its supporting underpad simulate a portion of a natural grass surface.

2. A synthetic turf surface as defined in claim 1, said polypropylene material being formed from polypropylene beads having a density of approximately between about 1.3 and 1.9 pounds per cubic foot and said polypropylene material having a thickness of approximately between about 1 inch to 2 inches whereby the surface forms a simulated natural golf green or a tee-off portion of a golf course.

3. A synthetic turf surface as defined in claim 1, said polypropylene material being formed from polypropylene beads having a density of approximately 1.9 pounds per cubic foot and said polypropylene material having a thickness of approximately between about ½ inch to 1 inch thickness to form a simulated natural grass tennis court playing surface.

4. A synthetic turf surface as defined in claim 1, said polypropylene material being formed from polypropylene beads having a density of approximately 1.3 pounds per cubic foot and said underpad being approximately between about 1 to 2 inches thick to form a simulated natural golf surface tee-off portion.

5. A synthetic turf surface as defined in claim 1, said polypropylene material being formed from propylene beads having a density of approximately 1.9 pounds per cubic foot and the thickness of the underpad being approximately between about 1 to 2 inches, to form a simulated natural golf green surface.

6. A synthetic turf surface as defined in claim 1 and said underpad being molded of expanded polypropylene beads of approximately between about 1.3 to 2.8 pounds per cubic foot density and approximately between about ½ inch to 2 inches thickness, molded into a unitary, open cell, pad of a density of approximately between about 1.5 to 3 pounds per cubic foot.

7. A synthetic turf surface as defined in claim 6 and with the density of said molded underpad being approximately 2.36 pounds per cubic foot to form a simulated natural portion of a golf course surface.

8. A synthetic turf surface as defined in claim 1 and including the upper end portions of said strands being shredded into slivers which are matted and intertwined, and with a layer of particulate material applied upon the upper surface of the base sheet and generally beneath the intertwined slivers and substantially filling the interstices between the strands and said layer is covered by said intertwined slivers.

9. A surface as defined in claim 8, wherein said particulate material is sand.

10. A synthetic turf surface as defined in claim 1 and including a reinforcement binder layer of a flexible, resilient material, applied to the lower surface of the base sheet and above the upper surface of the underpad and formed of a synthetic plastic adhesive material.

11. A synthetic turf surface as defined in claim 1 and including numerous, spaced-apart, short slits formed in the carpet with the slits being of a size to temporarily receive a downwardly inserted standard size golf tee, whereby a golf player may manually insert a tee in any selected slit to support a golf ball for a drive.

12. A synthetic rooftop or patio or deck surface formed of a synthetic grass carpet having a flexible base sheet with spaced apart, upright strands of plastic material secured to the sheet, and with the strands forming an exposed upper surface and said base sheet being positioned upon a resilient cushion underpad arranged upon a support surface, the improvement comprising:

said underpad being formed of a sheet of a molded, open cell, expanded, resilient polypropylene material formed from polypropylene beads being of density of between about 1.3 to 2.8 pounds per cubic foot and said underpad being of a thickness of between about ¼ inch to 12 inches;

whereas said carpet and its supporting underpad simulate a portion of a natural grass surface.

13. A surface as defined in claim 12, said polypropylene material being formed from polypropylene beads having a density of approximately between about 1.3 and 1.9 pounds per cubic foot and said polypropylene material having a thickness of approximately between about 1 inch to 2 inches whereby the surface resembles a simulated natural grass surface.

14. A surface as defined in claim 12, said polypropylene material being formed from polypropylene beads having a density of approximately 1.9 pounds per cubic foot and said polypropylene material having a thickness of approximately between about ½ inch to 1 inch thickness.

15. A surface as defined in claim 12, said polypropylene material being formed from polypropylene beads having a density of approximately 1.3 pounds per cubic foot and said underpad being approximately between about 1 to 2 inches thick.

16. A surface as defined in claim 12, said polypropylene material being formed from polypropylene beads having a density of approximately 1.9 pounds per cubic foot and the thickness of the underpad being approximately between about 1 to 2 inches.

17. A surface as defined in claim 12 and said underpad being molded of expanded polypropylene beads of approximately between about 1.3 to 2.8 pounds per cubic foot density and approximately between about ½ inch to 2 inches thickness, molded into a unitary, open cell, pad of a density of approximately between about 1.5 to 3 pounds per cubic foot.

18. A surface as defined in claim 17 and with the density of said molded underpad being approximately 2.36 pounds per cubic foot.

19. A surface as defined in claim 12 and including the upper end portions of said strands being shredded into silvers which are matted and intertwined.

20. A surface as defined in claim 12 and including the upper end portions of said strands being shredded into slivers which are matted and intertwined, and with a layer of particulate material applied upon the upper surface of the base sheet and generally beneath the intertwined slivers and substantially filling the interstices between the strands and said layer is covered by said intertwined silvers.

21. A surface as defined in claim 20, wherein said particulate material is sand.

22. A surface as defined in claim 12 and including a reinforcement binder layer of a flexible, resilient material, applied to the lower surface of the base sheet and above the upper surface of the underpad and formed of a synthetic plastic adhesive material.

23. A synthetic turf surface for simulating golf and other natural grass game playing surfaces comprising:
   a resilient cushion underpad arranged upon a support surface;
   a synthetic grass carpet having a flexible base sheet positioned upon said support surface, said synthetic grass carpet having spaced apart, upright strands of plastic material secured to the sheet;
   said underpad being formed of a sheet of a molded, open cell, expanded, resilient polypropylene material formed from polypropylene beads being of density of between about 1.3 to 2.8 pounds per cubic foot and said underpad being of a thickness of between about ¼ inch to 12 inches;
   wherein the strands form an exposed upper surface; and
   whereas said carpet and its supporting underpad simulate a portion of a natural grass surface.

24. A synthetic turf surface as defined in claim 23, said polypropylene material belong formed from polypropylene beads having a density of approximately between about 1.3 and 1.9 pounds per cubic foot and said polypropylene material having a thickness of approximately between about 1 inch to 2 inches whereby the surface forms a simulated natural golf green or a tee-off portion of a golf course.

25. A synthetic turf surface as defined in claim 23, said polypropylene material being formed from polypropylene beads having a density of approximately 1.9 pounds per cubic foot and said polypropylene material having a thickness of approximately between about ½ inch to 1 inch thickness to form a simulated natural grass tennis court playing surface.

26. A synthetic turf surface as defined in claim 23, said polypropylene material being formed from polypropylene beads having a density of approximately 1.3 pounds per cubic foot and said underpad being approximately between about 1 to 2 inches thick to form a simulated natural golf surface tee-off portion.

27. A synthetic turf surface as defined in claim 23, said polypropylene material being formed from polypropylene beads having a density of approximately 1.9 pounds per cubic foot and the thickness of the underpad being approximately between about 1 to 2 inches, to form a simulated natural golf green surface.

28. A synthetic turf surface as defined in claim 23 and said underpad being molded of expanded polypropylene beads of approximately between about 1.3 to 2.8 pounds per cubic foot density and approximately between about ½ inch to 2 inches thickness, molded into a unitary, open cell, pad of a density of approximately between about 1.5 to 3 pounds per cubic foot.

29. A synthetic turf surface as defined in claim 28 and with the density of said molded underpad being approximately 2.36 pounds per cubic foot to form a simulated natural portion of a golf course surface.

30. A synthetic turf surface as defined in claim 23 and including the upper end portions of said strands being shredded into slivers which are matted and intertwined, and with a layer of particulate material applied upon the upper surface of the base sheet and generally beneath the intertwined slivers and substantially filling the interstices between the strands and said layer is covered by said intertwined slivers.

31. A surface as defined in claim 30, wherein said particulate material is sand.

32. A synthetic turf surface as defined in claim 23 and including a reinforcement binder layer of a flexible, resilient material, applied to the lower surface of the base sheet and above the upper surface of the underpad and formed of a synthetic plastic adhesive material.

33. A synthetic turf surface as defined in claim 23 and including numerous, spaced-apart, short slits formed in the carpet with the slits being of a size to temporarily receive a downwardly inserted standard size golf tee, whereby a golf player may manually insert a tee in any selected slit to support a golf ball for a drive.

34. A synthetic rooftop or patio or deck surface comprising:
   a resilient cushion underpad arranged upon a support surface;
   a synthetic grass carpet having a flexible base sheet positioned upon said support surface, said synthetic grass carpet having spaced apart, upright strands of plastic material secured to the sheet;
   said underpad being formed of a sheet of a molded, open cell, expanded, resilient polypropylene material formed from polypropylene beads being of density of between about 1.3 to 2.8 pounds per cubic foot and said underpad being of a thickness of between about ¼ inch to 12 inches;

wherein the strands form an exposed upper surface; and whereas said carpet and its supporting underpad simulate a portion of a natural grass surface.

35. A surface as defined in claim 34, said polypropylene material being formed from polypropylene beads having a density of approximately between about 1.3 and 1.9 pounds per cubic foot and said polypropylene material having a thickness of approximately between about 1 inch to 2 inches whereby the surface resembles a simulated natural grass surface.

36. A surface as defined in claim 34, said polypropylene material being formed from polypropylene beads having a density of approximately 1.9 pounds per cubic foot and said polypropylene material having a thickness of approximately between about ½ inch to 1 inch thickness.

37. A surface as defined in claim 34, said polypropylene material being formed from polypropylene beads having a density of approximately 1.3 pounds per cubic foot and said underpad being approximately between about 1 to 2 inches thick.

38. A surface as defined in claim 34, said polypropylene material being formed from polypropylene beads having a density of approximately 1.9 pounds per cubic foot and the thickness of the underpad being approximately between about 1 to 2 inches.

39. A surface as defined in claim 34 and said underpad being molded of expanded polypropylene beads of approximately between about 1.3 to 2.8 pounds per cubic foot density and approximately between about ½ inch to 2 inches thickness, molded into a unitary, open cell, pad of a density of approximately between about 1.5 to 3 pounds per cubic foot.

40. A surface as defined in claim 39 and with the density of said molded underpad being approximately 2.36 pounds per cubic foot.

41. A surface as defined in claim 34 and including the upper end portions of said strands being shredded into silvers which are matted and intertwined.

42. A surface as defined in claim 34 and including the upper end portions of said strands being shredded into silvers which are matted and intertwined, and with a layer of particulate material applied upon the upper surface of the base sheet and generally beneath the intertwined slivers and substantially filling the interstices between the strands and said layer is covered by said intertwined slivers.

43. A surface as defined in claim 42, wherein said particulate material is sand.

44. A surface as defined in claim 34 and including a reinforcement binder layer of a flexible, resilient material, applied to the lower surface of the base sheet and above the upper surface of the underpad and formed of a synthetic plastic adhesive material.

* * * * *